United States Patent [19]

Malzbender

[11] Patent Number: 5,414,803
[45] Date of Patent: May 9, 1995

[54] METHOD UTILIZING FREQUENCY DOMAIN REPRESENTATIONS FOR GENERATING TWO-DIMENSIONAL VIEWS OF THREE-DIMENSIONAL OBJECTS

[75] Inventor: Thomas Malzbender, Mountain View, Calif.

[73] Assignee: Hewlett-Packard Company, Palo Alto, Calif.

[21] Appl. No.: 88,398

[22] Filed: Jul. 7, 1993

Related U.S. Application Data

[63] Continuation of Ser. No. 639,863, Jan. 11, 1991, abandoned.

[51] Int. Cl.⁶ .............................................. G06T 5/10
[52] U.S. Cl. .................................. 395/127; 395/137; 364/413.2
[58] Field of Search ............................. 395/127, 137; 364/413.13, 413.16, 413.19, 413.2, 413.22

[56] References Cited

U.S. PATENT DOCUMENTS 4,616,318 10/1986 Crawford ........................ 364/413.2
4,924,388 5/1990 Stansfield et al. ......... 364/413.16 X
5,079,697 1/1992 Chesler ............................ 364/413.2

Primary Examiner—Mark K. Zimmerman

[57] ABSTRACT

The view generated is the view of a three-dimensional object that would be obtained if the object in question consisted of a translucent material illuminated with a beam of parallel light is generated. The method utilizes a spatial-to-frequency domain transformation that substantially reduces the computational workload. Once the object representation in the frequency domain has been generated, the computational workload needed to generate a projection is significantly less than that needed in other methods.

4 Claims, 2 Drawing Sheets

METHOD UTILIZING FREQUENCY DOMAIN REPRESENTATIONS FOR GENERATING TWO-DIMENSIONAL VIEWS OF THREE-DIMENSIONAL OBJECTS

CROSS REFERENCE TO RELATED APPLICATION(S)

This is a continuation of application Ser. No. 07/639,863, filed on Jan. 11, 1991, now abandoned.

FIELD OF THE INVENTION

The present invention relates to computer image generation, and more particularly, to methods for generating images based on three-dimensional data.

BACKGROUND OF THE INVENTION

Many measurement techniques produce data representing the variation of some physical property over a three-dimensional volume. For example, magnetic imaging techniques used in medical imaging generate data representing the density and environment of hydrogen nuclei at various locations in the subject's body. Similarly, CAT scans measure the x-ray absorbance at various locations in the subject's body. All of these techniques generate three- dimensional arrays of data in which each point in the array represents the measured physical property at a corresponding point in the object under examination.

Presenting the large amount of data generated by such imaging techniques in a manner that is easily assimilated by human observers presents significant computational problems. The process of converting three-dimensional arrays of data to images representing that data is referred to as volume rendering. Several approaches to this problem have been implemented. In general, these approaches assign "optical" properties to each point in a three-dimensional volume which is broken into small volumes referred to as voxels. Ideally, an image is then produced by calculating the image one would see on a screen located between the object and the viewer if a three-dimensional object having these optical properties were viewed from a given location when the object is illuminated. Unfortunately, the computational difficulty inherent in taking into account reflections, absorption, and scattering in each voxel are too great to allow an exact computation to be made. Hence, various approximations to the exact computation are utilized.

One general approach which is computationally manageable is referred to as ray casting. This approach assigns color and opacity values to each voxel. A ray is generated corresponding to each pixel on the viewing screen. At the ray passes through the various voxels, color values are integrated along the ray path. The resultant calculated value is essentially equivalent to the light reaching the screen along the ray that would be generated if each voxel consisted of a material which generated light of the color in question and absorbed light according to the assigned opacity value. High opacity values at a particular voxel will cause a strong color contribution from that voxel as well as attenuating color values generated by voxels behind the voxel in question. The contributions of secondary rays produced by reflections and refractions in other voxels are ignored in this approximation.

While this type of volume rendering generates useful images, the computational workload is prohibitive if the three-dimensional data array is large. As the resolution of the measuring devices increases, the size of the three-dimensional data arrays in question increase dramatically. An improvement of a factor of two in resolution results in a factor of eight increase in the size of the three-dimensional data array and a similar increase in the computational workload.

On conventional sequential computers, the time to calculate a single view of the data may be several hours. Such long computational times severely limit the usefulness of such imaging techniques. In general, the viewer must examine several such images to find the view point that best displays the features of the data which are of interest. Hence, interactive systems in which the user can move his or her viewpoint relative to the "object" are advantageous. To provide such interactive displays, parallel computer computation is necessary. Thus such systems are limited to computers that are not generally available to the average user.

Broadly, it is an object of the present invention to provide an improved imaging method and apparatus for visualizing three-dimensional data.

It is a further object of the present invention to provide an imaging method and apparatus which does not require special purpose computers.

These and other objects of the present invention will become apparent to those skilled in the art from the following detailed description of the present invention and the accompanying drawings.

SUMMARY OF THE INVENTION

The present invention comprises a method for operating a digital computer to generate a projection view of a three-dimensional object. The object is defined in terms of a three dimensional representation in a spatial coordinate system. A view screen is defined with respect to the object in question. The method of the present invention first transforms the three-dimensional representation of said object into the frequency domain using a spatial to frequency domain transformation such as a Fourier transform. A two-dimensional frequency representation of the projection view is generated by computing the values of the three-dimensional frequency domain representation on a frequency domain slicing plane. The frequency domain slicing plane is a plane passing through the origin in the frequency domain having the same orientation to the axes of the frequency domain coordinate system as the view plane had to the spatial coordinate system. A spatial domain parallel projected view of the object is then generated by applying a two-dimensional frequency to spatial domain transformation to said two-dimensional frequency representation. The spatial domain projected view may then be displayed on a conventional view screen connected to the computer.

DETAILED DESCRIPTION OF THE INVENTION

Figure 1:
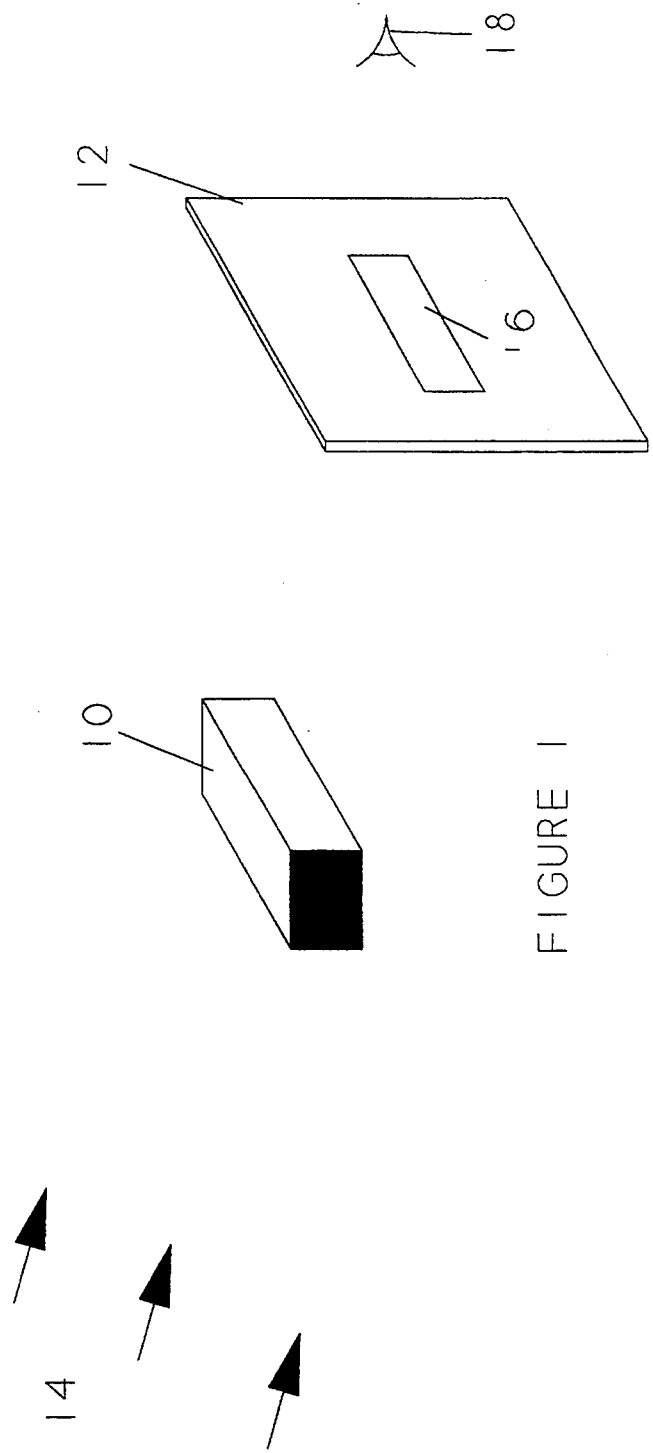
FIG. 1 illustrates the type of projection view generated by the method of the present invention.

The present invention constructs the view of the three-dimensional object that would be obtained if the object consisted of a translucent material illuminated with a beam of parallel light. The method is based on the Fourier Projection Slice Theorem. The image comprises the projection of the object on a viewing screen at right angles to the direction of the beam of light. The type of view obtained with the present invention may be more easily understood with reference to FIG. 1. Consider an object 10 which is defined by image data. For the purposes of this discussion, the object will be assumed to be defined by a continuous three-dimensional density function I(x,y,z). A viewing screen 12 is placed in relation to the object. An observer 18 views the screen from the side opposite the object. The object is illuminated with a beam of parallel light 14 having a direction perpendicular to the viewing screen. The light passing through object 10 is attenuated by object 10. The attenuated light strikes screen 12 producing image 16. It is useful to define a coordinate system 19 for describing the orientation of object 10 and viewing screen 12. Since object 10 is assumed to be illuminated by a beam of parallel light, the resulting image is independent of the distance between object 10 and viewing screen 12.

The present invention provides a significant decrease in the computational workload needed to view a plurality of projections of the object by first transforming the object into the frequency domain using either a Fourier or Hartley transform. For the purpose of the following discussion, the Fourier transform will be discussed. Since the object consists of real numbers, it will be apparent to those skilled in the art that a Hartley transform may also be utilized, thereby further reducing the computational workload. To simplify the following discussion, it will be assumed that the object is represented by a continuous function I(x,y,z). The case in which the object is represented by a three-dimensional discrete data array will then be discussed.

The method of the present invention comprises three steps. First, the function I(x,y,z) is transformed into the frequency domain using a three-dimensional Fourier transform. Second, a two-dimensional frequency function which depends on the orientation of the object relative to the viewing screen is computed from the transformed data. Finally, an inverse Fourier transform is used to compute the two-dimensional image to be displayed on the screen.

A computationally intensive part of the method lies in the transformation of I(x,y,z) into the frequency domain. The computational workload depends on the size of the data set being visualized. However, for typical data sets, the computational workload for carrying out the transformation is of the same order of complexity as that required to perform a single ray casting operation. This transformation need only be carried out once. Once the transformed function is known, the computational workload to generate a two-dimensional projection on a screen is approximately a factor of 100 less than that needed to generate a two-dimensional projection using conventional methods. Hence, a viewer may explore numerous projection perspectives at a small fraction of the computational workload of conventional methods.

In a typical image viewing system, the image would first be transformed into the frequency domain. The transformed image may be stored in place of the original image. When projections of the object in question are to be generated, the viewer inputs data specifying the orientation of the view screen. The computer then generates a projected view of the object using the frequency domain representation and the specified screen orientation. If the view is not satisfactory for the observers purpose, the observer then inputs a new orientation for the view screen and a new projection generated from the frequency domain representation and the new screen orientation. This process is repeated until the observer is satisfied with the orientation of the view screen. Once the desired orientation is found, more time consuming projection techniques may be applied to the data if desired.

Figure 2:
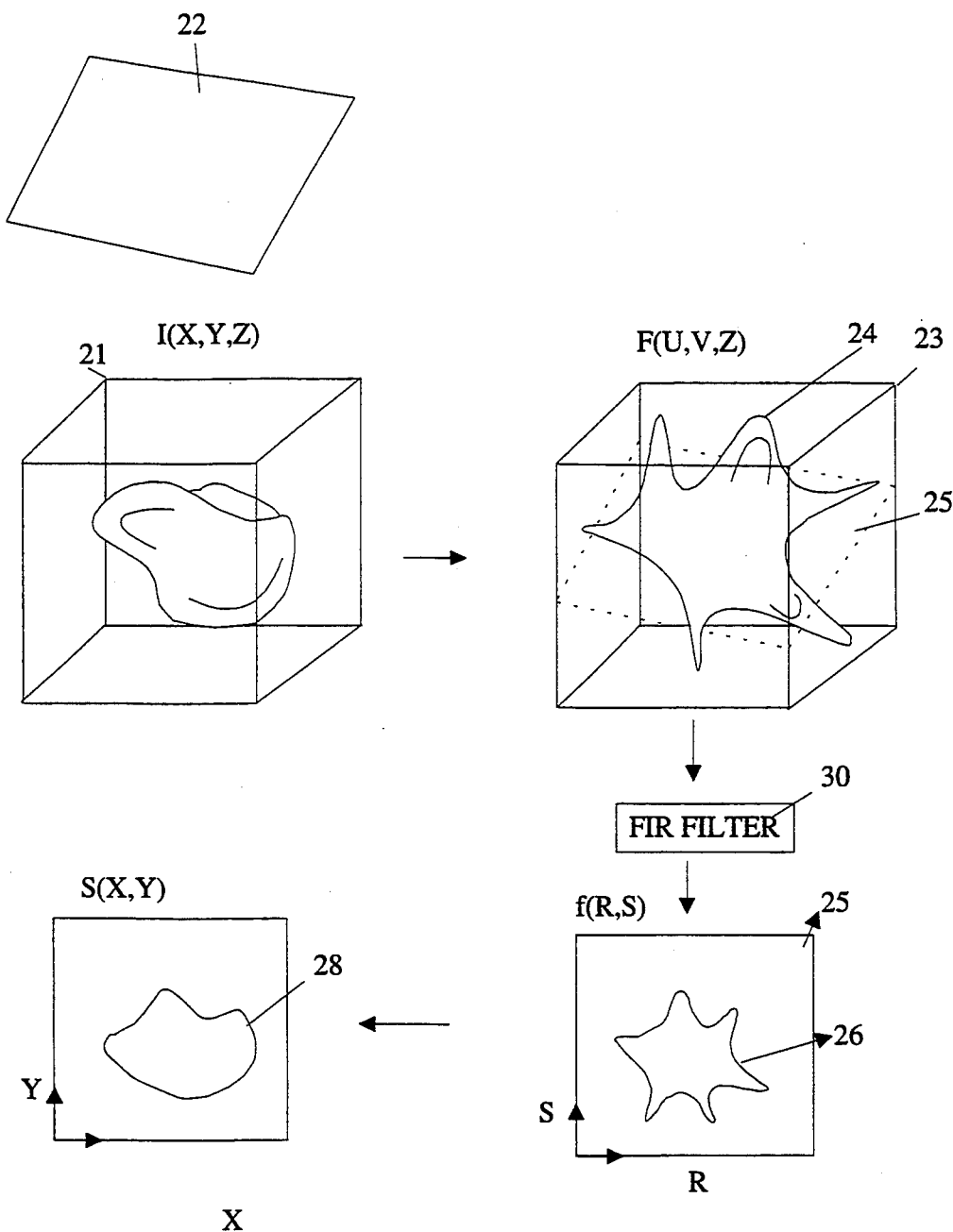
FIG. 2 illustrates the steps utilized by the present invention in generating a view of an object.

Refer now to FIG. 2 which illustrates the steps described above. An object 20 is defined in a spatial coordinate system 21. As noted above, it will be assumed that the object is represented by a continuous density function I(x,y,z). In the first step, the frequency transform of I(x,y,z) is computed from the following relationship:

$$F(u,v,w) = \int\int\int I(x,y,z) e^{-2\pi i(ux+vy+wz)} dx dy dy \quad (1)$$

Here, F(u,v,w) is the frequency transform in question and is shown at 24 in FIG. 2.

In the second step of the method, a two-dimensional function f(r,s) is computed from F(u,v,w) and orientation of the view screen 22. The view screen comprises a plane in the spatial coordinate system in which I(x,y,z) is defined. This plane may be specified by angles at which the normal to the plane intersect the axes of coordinate system 21. A similar coordinate system 23 may be defined in the frequency domain. Define a plane passing through the origin of the coordinate system in the frequency domain, i.e., through (u,v,w)=(0,0,0), which has the same orientation to the axes in the frequency domain as the view screen has to the axes in the spatial domain. This plane shall be referred to as the frequency domain slicing plane in the following discussion. The plane in question is shown at 25 in FIG. 2. Next, define a two-dimensional coordinate system on the frequency domain slicing plane. For the purposes of this discussion, it will be assumed that the two-dimensional coordinate system in question is Cartessian; however, other coordinate systems will be apparent to those skilled in the art. Each point (r,s) in this two-dimensional coordinate system cooresponds to some point (u,v,w) in the frequency domain. The axes of the slicing plane may be defined by two orthonormal vectors m,n in the frequency domain coordinate system in which F(u,v,w) is defined, then points on f(r,s) are given by $$f(r,s) = F(ru_m + su_n, rv_m + sv_n, rw_m + sw_n) \quad (2)$$

where $$m = (u_m, v_m, w_m) \quad (2a)$$

and $$n = (u_m, v_m, w_m) \quad (2b)$$

The image to be displayed on view screen 28 will be denoted by S(x,y). S(x,y) is obtained by taking the inverse Fourier transform of f(r,s), i.e., $$S(x, y) = \frac{1}{4\pi^2} \int\int f(r, s) e^{+2\pi i(rx+sy)} dr ds \quad (3)$$

In most practical applications of the present invention, the object is specified by an array of values measured on some three-dimensional grid rather than a continuous function I(x,y,z). In this case, two changes must be made to the method of the present invention. First, I(x,y,z) is replaced by a set of values $\{I_{k,m,n}\}$, and the continuous Fourier transforms shown in Eq.s (1) and (3) are replaced by discrete Fourier transforms.

$$F_{u,v,w} = \sum_{k=0}^{N-1} \sum_{m=0}^{N-1} \sum_{n=0}^{N-1} I_{k,m,n} e^{-2\pi i(uk+vm+wn)/N} \quad (4)$$

Here, it has been assumed that the object is represented by a set of values measured on a regular N×N×N grid. Eq.(4) defines a set of discrete values $\{F_{u,v,w}\}$ in the frequency domain.

Second, the calculation of f(r,s) from $\{F_{u,v,w}\}$ now requires that the $\{F_{u,v,w}\}$ be interpolated to generate a set of values f(r,s) on the frequency domain slicing plane. The manner in which this interpolation is performed can introduce artifacts into the final screen image generated by performing the inverse Fourier transform of f(r,s). In the preferred embodiment of the present invention, this interpolation is carded out with the aid of a three-dimensional interpolation function which approximates a sinc function.

For the purpose of this discussion, a sinc function will be defined as the continuous Fourier transform of an object consisting of a cubic solid having sides aligned with the axes of the coordinate system in the spatial domain. The interpolation in the frequency domain can be seen as the following operation. A discrete function D(u,v,w) is defined from the discrete values $F_{uvw}$ $$D(u,v,w) = F_{u,v,w} \text{ if } (u,v,w) \text{ is in } \{(k,m,n)\} \text{ and} \quad (5)$$
$$= 0 \text{ otherwise}$$

The discrete function D(u,v,w) is convolved with an approximation to a sinc function to generate the values of F(u,v,w) needed at the desired sample points (r,s). To evaluate F at a particular point (u,v,w), the following convolution is performed $$F(u,v,w) = \int \int \int D(p,q,r) G(u-p, v-q, w-r) dp\, dq\, dr \quad (6)$$

where G(u,v,w) is an approximation of the sinc function.

It should be noted that the sinc function is non-zero over the entire frequency domain; hence, the integrations shown in Eq. (6) would need to be carried out at least over the entire range of the data set used to define D(u,v,w). Such an integration would impose an unacceptable computational workload. Hence, an approximation to the sinc function which is non-zero over only a limited portion of the frequency domain is perferred. Such an approximation reduces the operations shown in Eq. (6) to a finite impulse response filtering operation. It has been found experimentally that a (5×5×5) filter is adequate to guarantee errors of less than one grey level for an arbitrary data set having 8-bits per color. In fact, it has been found that a (3×3×3) filter is adequate for most purposes.

Although the continuous inverse Fourier transform of f(r,s) could, in principle, be utilized to generate the screen image, in practice a discrete version of the inverse transform is preferred to reduce computation. If a discrete inverse transform is utilized, sufficient points in the frequency domain slicing plane must be utilized to assure that the resulting screen image does not including aliasing artifacts.

Since most image data consists of real numbers, a Hartley transform may be used in place of the Fourier transform discussed above. This replacement lowers the computational workload. If a three-dimensional Hartley Transform is utilized, Eq. (4) would be replaced by $$F_{u,v,w} = \quad (7)$$

$$\frac{1}{N^3} \sum_{k=0}^{N-1} \sum_{m=0}^{N-1} \sum_{n=0}^{N-1} I_{k,m,n} \left[ \cos\left(2\pi \frac{uk+vm+wn}{N}\right) + \sin\left(2\pi \frac{uk+vm+wn}{N}\right) \right]$$

In this case, the screen display is calculated from the frequency domain slicing plane function f(u,v) by the two-dimensional inverse Hartley Transform $$S(x,y) = \quad (8)$$

$$\sum_{r=0}^{N-1} \sum_{s=0}^{N-1} f(r,s) \left[ \cos\left(2\pi \frac{rx+sy}{N}\right) + \sin\left(2\pi \frac{rx+sy}{N}\right) \right]$$

There has been described herein a novel method for generating projections based on measured properties of an object. Various modifications to the present invention will become apparent to those skilled in the art from the foregoing description and accompanying drawings. Accordingly, the present invention is to be limited solely by the scope of the following claims.

What is claimed is:

1. A method for operating a digital computer to generate a projection view of a three-dimensional object for display to an observer comprising the steps of:

defining a spatial coordinate system relative to said object;

defining a three-dimensional representation of said object relative to said spatial coordinate system;

defining a view screen having an orientation selected by the observer relative to said spatial coordinate system;

defining a frequency domain coordinate system;

generating a three-dimensional frequency domain representation, F(u,v,w), of said object by transforming said three-dimensional spatial representation of said object into said frequency domain coordinate system using a spatial-to-frequency domain transformation;

defining a frequency domain slicing plane having the same orientation in said frequency domain coordinate system as said view screen has in said spatial coordinate system, said frequency domain slicing plane passing through the origin of said frequency domain coordinate system, said frequency domain slicing plane having a two-dimensional coordinate system defined thereon;

defining a two-dimensional frequency domain function comprising F(u, v, w) for values of (u,v,w) on said frequency domain slicing plane;

generating the projection view from said two-dimensional frequency domain function by applying a two-dimensional frequency-to-spatial domain transformation to said two-dimensional frequency domain function;

defining a second view screen having a second orientation selected by the observer relative to said spatial coordinate system;

defining a second frequency domain slicing plane having the same orientation in said frequency domain coordinate system as the second view screen has in said spatial coordinate system;

defining a second two-dimensional frequency domain function comprising F(u,v,w) for values of (u,v,w) on said second frequency domain slicing plane; and generating a second projection view from said second two-dimensional frequency domain function by applying said two-dimensional frequency-to-spatial domain transformation to said second two-dimensional frequency domain function.

2. The method of claim 1 wherein said spatial-to-frequency domain transformation and said frequency to spatial domain transformation are Fourier transforms.

3. The method of claim 1 wherein said spatial-to-frequency domain transformation and said frequency-to-spatial domain transformation are Hartley transforms.

4. A method for operating a digital computer to generate a projection view of a three-dimensional object for display to an observer comprising the steps of:

defining a spatial coordinate system relative to said object;

defining a three-dimensional representation of said object relative to said spatial coordinate system, said three-dimensional representation of said object comprising an array {I(k,m,n)} of discrete spatial values;

defining a view screen having a predetermined orientation relative to said spatial coordinate system;

defining a frequency domain coordinate system;

generating a three-dimensional frequency domain representation of said object by transforming said three-dimensional spatial representation of said object into said frequency domain coordinate system using a spatial-to-frequency domain transformation, said three-dimensional frequency domain representation comprising a set {F(u,v,w)} of discrete spatial values in the frequency domain;

defining a frequency domain slicing plane having the same orientation in said frequency domain coordinate system as said view screen has in said spatial coordinate system, said frequency domain slicing plane passing through the origin of said frequency domain coordinate system, said frequency domain slicing plane having a two-dimensional coordinate system defined thereon;

interpolating the frequency domain representation {F(u,v,w)} to obtain a set of values of a two-dimensional frequency domain function f(r,s) on the frequency domain slicing plane, said interpolation being accomplished by evaluating a convolution of a three-dimensional interpolation function with {F(u,v,w)}; and generating the projection view from said two-dimensional frequency domain function by applying a two-dimensional frequency-to-spatial domain transformation to said two-dimensional frequency domain function.

* * * * *